United States Patent Office 3,681,305
Patented Aug. 1, 1972

3,681,305
TRANSPARENT, HIGH HEAT POLYSTYRENES
Michael R. Tirpak, Maywood, and Harold A. Rendleman, Bellwood, Ill., assignors to The Richardson Company, Des Plaines, Ill.
No Drawing. Filed Nov. 13, 1970, Ser. No. 89,488
Int. Cl. C08f 17/00
U.S. Cl. 260—80.78                                    2 Claims

ABSTRACT OF THE DISCLOSURE

The present invention relates to a new terpolymer having high heat distortion resistance and excellent clarity. The terpolymer is derived from three monomers, namely, styrene, t-butylstyrene and methyl methacrylate, preferably copolymerized by a suspension process.

DESCRIPTION OF THE INVENTION

Various styrene polymers and copolymers have been developed and are in commercial use which are relatively clear and resemble glass. Such polymers may be molded into a variety of shapes to serve a desired end use. Typical polymers are those obtained by homopolymerizing styrene and methacrylates or copolymerizing monomers such as styrene and a methacrylate.

While the majority of such polymers are suitable for many applications, they have not proven adequate for applications requiring good heat distortion characteristics above 200° F. Attempts to improve the heat distortion properties of such polymers frequently result in a loss of clarity or transparency.

Accordingly, it is an object of this invention to provide styrene-type polymers having an improved resistance to distortion at elevated temperature without degradation of clarity.

The present invention comprises a terpolymer formed by copolymerizing styrene, t-butylstyrene and methyl methacrylate. The three monomers are preferably present by weight within the following ranges:

|                      | Percent |
|----------------------|---------|
| Styrene              | 5–80    |
| t-Butylstyrene       | 5–90    |
| Methyl methacrylate  | 5–90    |

Compositions of the foregoing type are characterized by excellent clarity and have a heat distortion temperature within the range of about 220°–270° F., as determined by ASTM 648–56 at a stress of 264 p.s.i. (annealed), enabling the polymers to withstand boiling water without distortion.

A presently preferred composition, wherein clarity and heat distortion properties are economically maximized, is one in which the polymerized components comprise by weight about 30% styrene, 45% t-butylstyrene and 25% methyl methacrylate.

The terpolymer is preferably made using a suspension polymerization process. An exemplary process is set forth below:

EXAMPLE

To a 20 gallon reactor is added 63 lbs. deionized water, and the pH is adjusted to about 11 with 5% potassium hydroxide. Freshly milled tricalcium phosphate (180 g.) suspended in 1.5 lbs. deionized water is then added. After heating to 140° F., a mixture of 19.5 lbs. styrene, 29.25 lbs. t-butylstyrene and 16.25 lbs. methyl methacrylate is added in which is also dissolved 40 g. benzoyl peroxide and 6 g. t-butyl peracetate as polymerization catalysts. The reaction mass is heated with agitation to 195° F. in 30 minutes, held at 195° F. for 6 hrs., then raised to 265° F. and held at 265° F. for one hour.

At this point, the polymerization is essentially complete. The resulting polymer beads are separated from the water, washed, dried, and extruded into pellets. Anti-oxidants, light stabilizers or other additives may be added prior to the extrusion step.

An injection molded sample made from the above terpolymer was characterized by good clarity, surface gloss, and sparkle, and had the following properties:

| | |
|---|---|
| Izod impact (notched) ft. lbs./inch | 0.30 |
| Tensile strength, p.s.i. | 7,500 |
| Elongation, percent | 1.7 |
| Tensile modulus, p.s.i. | 480,000 |
| Flexural strength, p.s.i. | 12,200 |
| Flexural modulus, p.s.i. | 390,000 |
| Heat distortion, temperature, ° F (264 p.s.i., annealed) | 233 |
| Specific gravity, g./cc. | 1.03 |
| Rockwell hardness, | |
| R-scale | 123 |
| M-scale | 72 |

Having described the invention and certain preferred embodiments, the same is only intended to be limited by the scope of the following claims:

We claim:

1. A terpolymer comprising the polymerization product of styrene, t-butylstyrene and methyl methacrylate characterized by a heat distortion temperature within the range of 220°–270° F. as determined by ASTM 648–56 at a stress of 264 p.s.i. (annealed), wherein the three components are present in the terpolymer within the following ranges by weight:

|                      | Percent |
|----------------------|---------|
| Styrene              | 5–80    |
| t-Butylstyrene       | 5–80    |
| Methyl methacrylate  | 5–90    |

2. A terpolymer comprising the polymerization product of styrene, t-butylstyrene and methyl methacrylate characterized by a heat distortion temperature within the range of 220°–270° F. as determined by ASTM 648–56 at a stress of 264 p.s.i. (annealed), wherein the three components are present in the terpolymer within about the following proportions by weight:

|                      | Percent |
|----------------------|---------|
| Styrene              | 30      |
| t-Butylstyrene       | 45      |
| Methyl methacrylate  | 25      |

References Cited

UNITED STATES PATENTS 3,009,895  11/1961  Slocombe _____ 260—80.78
3,318,813   5/1967  McCormick _____ 252—59

JOSEPH L. SCHOFER, Primary Examiner
R. S. BENJAMIN, Assistant Examiner